July 14, 1925.  1,546,075
E. H. HORN
BALANCE STAFF BEARING FOR TIMEPIECES
Filed Jan. 30, 1925
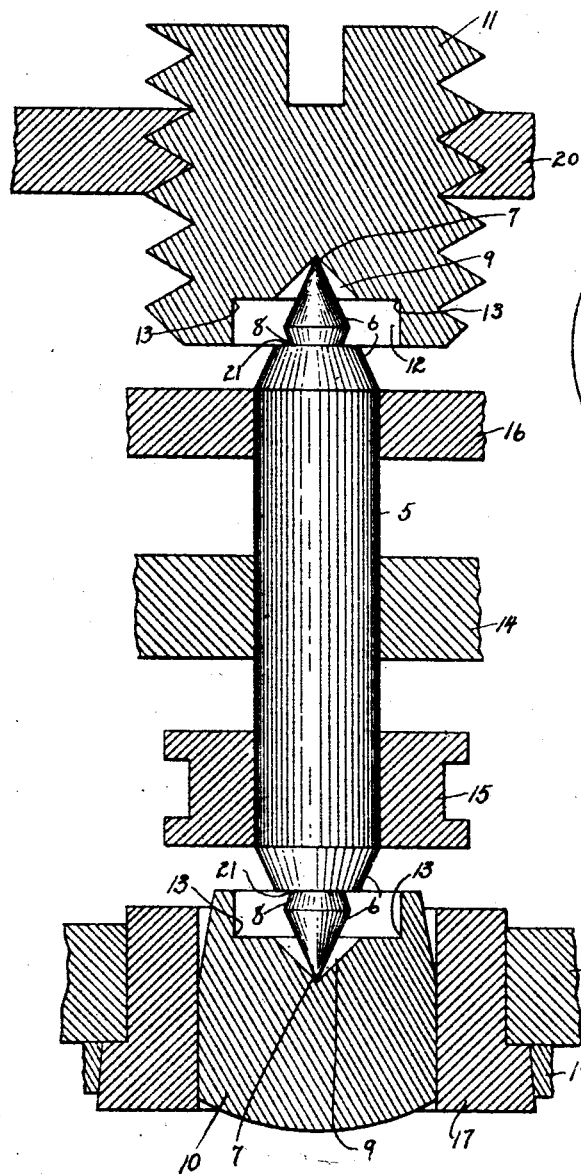
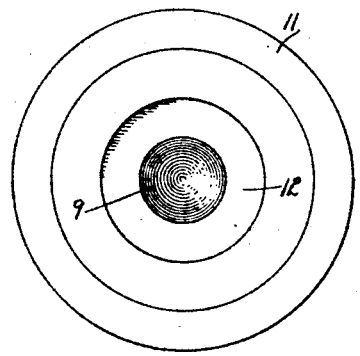
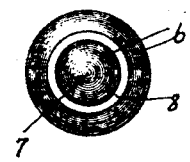
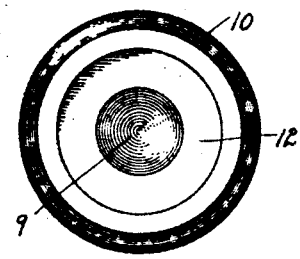
Inventor
Ernest H. Horn
by Seymour & Earle
Atty.

Patented July 14, 1925.

1,546,075

UNITED STATES PATENT OFFICE.

ERNEST H. HORN, OF WATERBURY, CONNECTICUT, ASSIGNOR TO WATERBURY CLOCK CO., OF WATERBURY, CONNECTICUT, A CORPORATION.

BALANCE-STAFF BEARING FOR TIMEPIECES.

Application filed January 30, 1925. Serial No. 5,744.

*To all whom it may concern:*

Be it known that I, ERNEST H. HORN, a citizen of the United States, residing at Waterbury, in the county of New Haven and State of Connecticut, have invented a new and useful Improvement in Balance-Staff Bearings for Timepieces; and I do hereby declare the following, when taken in connection with the accompanying drawings and the characters of reference marked thereon, to be a full, clear, and exact description of the same, and which said drawings constitute part of this application, and represent, in—

Fig. 1 a broken, sectional view, showing the mounting of a balance-staff in accordance with my invention, the staff itself being represented in elevation.

Fig. 2 a detached view, in inside end elevation, of the balance-screw.

Fig. 3 a detached, end view of the balance-staff.

Fig. 4 a detached, inside, end view of the balance-stud.

My invention relates to an improvement in balance-staff bearings for time-pieces, the object being to provide, at a trifling additional cost, a time-piece having conical point- and conical cup bearings, with means whereby the oil employed for lubricating the same is prevented from being withdrawn therefrom and distributed over the adjacent surfaces of the movement by capillary action.

With these ends in view, my invention consists in a balance-staff bearing having certain details of construction as will be hereinafter described and particularly pointed out in the claim.

As herein shown, the balance-staff 5 is formed at its ends with conical bearings 6 terminating in bearing-points 7 and each formed about midway of its length with a circumferential angular groove-like recess 8 forming a sharp re-entrant angle 21, such angles having been found to substantially check the withdrawal of oil from the bearing by capillarly action. The said bearing-points 7 of the staff run in oil-receiving, conical bearing-cups 9 respectively formed in the balance-stud 10 and balance-screw 11 of the time-piece. The bearing-cups 9 are formed on wider angles than the conical bearings 6 of the staff, so that the actual running bearing thereof falls exclusively upon the bearing-points 7, and so that oil-pockets are formed between the points and cups for the reception of the oil employed to lubricate the bearing. As shown, the opposed inner ends of the balance-stud 10 and balance-screw 11 are formed with straight-walled, circular recesses 12 concentric with the conical bearing-cups 9, but larger in diameter than the same, and resulting in the production of re-entrant angles 13, which substantially prevent "creeping" of the oil out of the cups 9 by capillary action.

By my invention, I greatly improve, at a trifling additional cost, the action and wearing qualities of balance-staff bearings having conical points and conical cups, since I am thus enabled to check the draining away of the oil from the cups by capillary action and its distribution over the adjacent parts of the movement, causing the bearing-points to become dry, which results not only in rapid wear but also in unsatisfactory performance.

As shown, the staff 5 is provided with a balance-wheel 14, a hair-spring hub 15, and a safety-roller 16. The balance-stud is located in a bushing 17 set into the rear movement-plate 18 and also mounting the regulator 19, while the balance-screw 11 is mounted in the front movement-plate 20.

I claim:

In a balance-staff bearing for time-pieces, the combination with a balance-staff formed at its respective ends with conical bearings terminating in bearing-points, and each formed with a circumferential, annular, groove-like recess forming a sharp re-entrant angle, of a balance-stud and balance-screw, each formed with an angular bearing-cup receiving the respective bearing-points of the staff, the angles of the said cups being wider than the angles of the bearing-points and one or both of the said cups opening into a straight-walled, concentric, circular recess, resulting in the production of a re-entrant angle resisting the "creeping" of the oil out of the cup by capillary action.

In testimony whereof, I have signed this specification in the presence of two subscribing witnesses.

ERNEST H. HORN.

Witnesses:
HAZEL G. ATWOOD,
JAMES R. PUTNAM.